(12) United States Patent
Carlgren et al.

(10) Patent No.: US 7,818,165 B2
(45) Date of Patent: Oct. 19, 2010

(54) METHOD AND SYSTEM FOR LANGUAGE IDENTIFICATION

(75) Inventors: Richard Carlgren, Cary, NC (US); Daniel McCloskey, Santry (IE); Alexei Nevidomski, Swords (IE); Brian O'Donovan, Castleknock (IE); Mayo Takeuchi, Dublin (IE); Alexandre Troussov, Donabate (IE); Pavel Volkov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/189,579

(22) Filed: Jul. 26, 2005

(65) Prior Publication Data

US 2006/0229865 A1    Oct. 12, 2006

(30) Foreign Application Priority Data

Apr. 7, 2005    (GB)    ................. 0507036.2

(51) Int. Cl.
G06F 17/27 (2006.01)
G06F 17/28 (2006.01)
G06F 17/20 (2006.01)

(52) U.S. Cl. .................... 704/8; 704/1; 704/9
(58) Field of Classification Search .......... None
See application file for complete search history.

(56) References Cited

U.S. PATENT DOCUMENTS

| | | | | |
|---|---|---|---|---|
| 5,062,143 A | * | 10/1991 | Schmitt | ........... 382/230 |
| 6,023,670 A | * | 2/2000 | Martino et al. | ......... 704/8 |
| 6,216,102 B1 | * | 4/2001 | Martino et al. | ......... 704/9 |
| 6,272,456 B1 | * | 8/2001 | de Campos | ......... 704/8 |
| 6,292,772 B1 | | 9/2001 | Kantrowitz | ......... 704/9 |
| 6,415,250 B1 | * | 7/2002 | van den Akker | ......... 704/9 |
| 7,191,116 B2 | * | 3/2007 | Alpha | ......... 704/8 |
| 2004/0138869 A1 | * | 7/2004 | Heinecke | ......... 704/1 |
| 2006/0184357 A1 | * | 8/2006 | Ramsey et al. | ......... 704/9 |

OTHER PUBLICATIONS

El-Shishiny, H. et al. "Word Fragments Based Arabic Language Identification," Arabic Language Resources and Tools Conference, Sep. 22-23, 2004 Cairo Egypt.*

* cited by examiner

*Primary Examiner*—Matthew J Sked
(74) *Attorney, Agent, or Firm*—David A. Dagg

(57) ABSTRACT

A method and system for language identification are provided. The system includes a feature set of a plurality of character strings of varying length with associated information. The associated information includes one or more significance scores for a character string for one or more of a plurality of languages. Means are provided for detecting character strings from the feature set within a token from an input text. The system uses a finite-state device and the associated information is provided as glosses at the final nodes of the finite-state device for each character string. The associated information can also include significance scores based on linguistic rules.

35 Claims, 6 Drawing Sheets

METHOD AND SYSTEM FOR LANGUAGE IDENTIFICATION

CROSS REFERENCE TO RELATED APPLICATIONS

The present application claims priority under 35 USC 119 to United Kingdom Application Number 0507036.2, filed Apr. 7, 2005.

FIELD OF THE INVENTION

This invention relates to the field of automatic language identification of texts. In particular, the invention relates to automatic language identification of texts by variable length word fragments with associated information.

BACKGROUND OF THE INVENTION

There are in principle two different techniques for the automatic identification of the language of a text document: the word-based language identification on the one hand and the N-gram based identification on the other. Both methods work well on long texts, while N-grams are considered to be more robust for shorter texts.

The word-based language identification technique uses the fact that every language has a set of commonly occurring words. Intuitively, a sentence containing the words and, the, in, would most probably be English, whereas a sentence with the word der would be more likely to be German. One obvious implementation of this technique is to keep a separate lexicon for each possible language, and then to look up every word in the sample text to see in which lexicon it falls. The lexicon that contains the most words from the sample indicates which language was used. Weighted sum can be used, if words are provided with a score.

An advantage of this method is that words, especially function words (pronouns, prepositions, articles, auxiliaries), tend to be quite distinctive for language identification.

A disadvantage of this method is that although common words occur enough in larger texts, they might not occur in a shorter input text. Also, lexicons, especially for highly inflected languages, could be prohibitively large. The usage of full form lexicons is also hampered by possible misspellings and errors (like those arising from OCR process) and by the presence in texts of out-of-vocabulary words, especially in compounding languages like German.

The second language modeling technique is based on character N-grams (sequences of N consecutive characters), where N ranges typically from 2 to 5. Similarly to the common words technique, this technique assembles a language model from a corpus of documents in a particular language; the difference being that the model consists of character N-grams instead of complete words.

Absence of linguistic motivation imposes the following disadvantage for N-gram method: N-grams are not as distinctive as function words. For example, the trigrams '_bo', 'bos', and 'ost' are frequently used in the English language, and so the word bost, will have high score to be an English word. However, 'bost' is an archaic form not used in the modern English, while bost is an often used abbreviation in Sweden.

The rise of text data mining and knowledge management, makes new demands on the implementation parameters for language identification. In multi-lingual environments, identifying the language of a piece of text is usually a prerequisite for subsequent processing. In domains with severe constraints on the size of the analyzed texts and on computational resources, language identification of texts still remains an important practical problem. A need therefore exists for an improved method of language identification.

U.S. Pat. No. 6,292,772 entitled "Method for identifying the language of individual words" shows how decomposition of a word into a plurality of non-overlapping N-grams covering the entire word without gaps can be used to identify the language of this word. The method of implementation demonstrates that all three restrictions imposed on the decomposition—non-overlapping, non-gapped, coverage of the whole word are essential.

Current information retrieval is based on little use of linguistic tools. Development of linguistic tools is expensive, they are slow, and they are not available for many languages. Search tools try to use robust approaches, which combine language-dependent and language independent processing. A search (for example, a Google search) will not completely fail if one Latin-based text is identified as another Latin-based text (for example, Irish is identified as English).

However, there is a growing area of information extraction where language-dependent processing is vital. Whereas information retrieval finds relevant texts and presents them to the user, the typical information extraction application analyses texts and presents only the specific information from them that the user is interested in.

There is a need to provide a more "linguistic" approach to the problem of language identification. Computationally treatable features include at least: alphabet, phonetics, orthography, lexical roots, inflections/derivations/clitics, compounding, function (and other) words. However, many of these features are brittle, resulting in the features being difficult to use effectively. For example, "International" words like index or Schwarzenegger become purely Hungarian just by addition of a small suffix -nek (indexnek, Schwarzeneggernek); headlines are short, often containing "foreign" words, are capitalized and are not full sentences; diacritics are sometimes not used properly; texts contain typographical errors; emails and chat-rooms use informal styles of writings.

SUMMARY OF THE INVENTION

In order to exploit different linguistic levels in a manageable manner, the described method and system consider word fragments of variable length and methods of approximate morphological analysis. A key of the described method and system is that any kind of information can be associated with language constituents in a manner that is computationally efficient. This opens the way for using advanced linguistic expertise.

According to a first aspect of the present invention there is provided a system for language identification, comprising: a feature set of a plurality of character strings of varying length with associated information; the associated information including one or more significance scores for a character string for one or more of a plurality of languages; means for detecting character strings from the feature set within a token from an input text.

The system may include a finite-state device with the associated information provided as glosses at the final nodes of the finite-state device for each character string. The character strings may be compiled as a letter tree minimized to reuse common postfixes with common glosses.

The associated information may include additional significance scores based on linguistic rules. The significance scores for a character string may be based on one or more of the group of: the presence of language specific characters; function words; the length of the character string; the importance of the character string in a training corpus. The system may include means for determining the language of the input text from the significance scores.

The associated information may include positional information of the character string within a token; for example, the positional information may include complete word, word-initial, word-final, and word-internal indications.

The feature set is formed of character strings for a plurality of languages, which may use single or multiple character encodings.

The system may include means for dividing an input text into lexical or morphological tokens.

According to a second aspect of the present invention there is provided a method for language identification, comprising: inputting a text; dividing the text into tokens; detecting character strings within a token from a feature set of a plurality of character strings of varying length with associated information, the associated information including one or more significance scores for a character string for one or more of a plurality of languages.

The method may include identifying all character strings within an input text and adding the significance scores for a particular language for all character strings identified. The method may also include determining the language of the input text by sorting the significance scores for the plurality of languages and selecting the language with the highest score.

Detecting character strings within a token may comprise analyzing positional data and looking up a token for decreasing lengths of prefixes. Word-final tokens and character strings may be reversed.

According to a third aspect of the present invention there is provided a computer program product stored on a computer readable storage medium, comprising computer readable program code means for performing the steps of: inputting a text; dividing the text into tokens; detecting character strings within a token from a feature set of a plurality of character strings of varying length with associated information, the associated information including one or more significance scores for a character string for one or more of a plurality of languages.

According to a fourth aspect of the present invention there is provided a system for compiling a feature set, comprising: means for compiling a plurality of character strings of varying length; means for associating information with a character string, including means for allocating one or more significance scores for one or more of a plurality of languages.

According to a fifth aspect of the present invention there is provided a method for compiling a feature set, comprising: compiling a plurality of character strings of varying length; associating information with a character string, including allocating one or more significance scores for one or more of a plurality of languages.

The step of allocating one or more significance scores may use statistical analysis of language texts. Language models may be used to compile the plurality of character strings that are a characteristic feature of a subset of words that should be recognized in a language.

According to a sixth aspect of the present invention there is provided a computer program product stored on a computer readable storage medium, comprising computer readable program code means for performing the steps of compiling a plurality of character strings of varying length; associating information with a character string, including allocating one or more significance scores for one or more of a plurality of languages.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
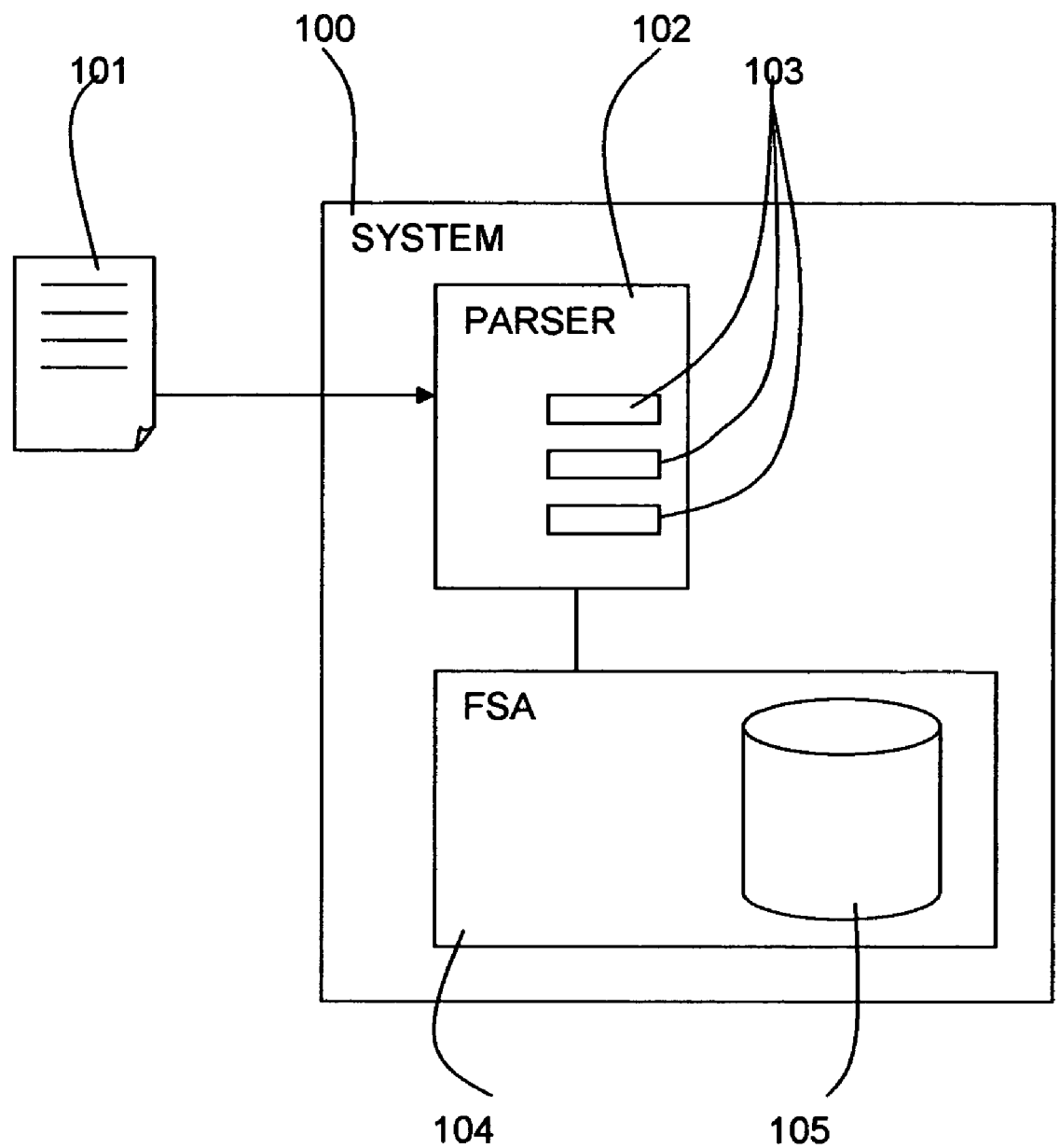
FIG. 1 is a block diagram of a system for language identification in accordance with the present invention.

The present invention provides a method and system for automatic identification of language of texts. Referring to FIG. 1, text 101 is input into a system 100. A parser 102 is provided for segmenting the text 101 into tokens 103. The form of the tokens 103 is discussed in more detail below but may be based on Unicode properties of the characters in the text 101. The parser 102 also exploits regular expressions mechanisms both for chunking and for detection of non-lexical items.

After detecting potential lexical tokens 103, a finite-state automaton (FSA) 104 is used for analyzing the tokens as potential lexical or morphological units of a language. The FSA 104 provides a compilation of words and subwords or word fragments for a plurality of "i" languages supported by the system 100. The FSA 104 provides a compact representation of the data and a fast dictionary look-up 105.

The described system uses word fragments (referred to as fragmas) for language and text modeling. The term "word fragment" is used generally to include strings of letters within a word, forming a whole word, or across two or more words. The word fragments are character strings of arbitrary length, provided with associated information. One form of the associated information is positional information to discriminate between strings representing full words, word-initial, word-internal and word-final fragments.

In an example embodiment, word fragments are collected into a dictionary 105, which consists of the entries in the following logical form:

"Word_fragment", "Position_within_word",
"WeightLang_1", "WeightLang_2", . . . , "Weight-Lang_N"
"Additional_score"

where:

"Word_fragment": This is a string of characters.

"Position_within_word": These are constraints, which specify the relative position of the word fragment within words. These may be provided as a combination of four Booleans:
valid orthographic word, word-initial, word-internal, word final strings.

For example, the constraints for the German allomorph Schul- is the tuple (false, true, true, false), which means that Schul- is not a valid word, but could be initial or internal (not final) constituent of solid German compounds.

"WeightLang_i": This is a significance score for a word fragment for specific language number i under consideration, i=1, 2, ..., N.

"Additional_score": This holds information about an additional significance score to modify the basic significance score if additional constraints are satisfied.

This dictionary 105 logically can be viewed as entries of the following type: keyword, associated glosses, where the keyword is the string "Word_fragment", glosses hold "Position_within_word", "WeightLang_i", and "Additional_score".

Without the loading of additional information, a string is only a sequence of characters, a kind of mechanical object, even if the string is provided with positional information within words. The described system provides a computationally efficient means of associating any kind of information with keyword constituents which enables linguistic rules to be applied for language identification.

Using linguistic expertise, a word fragment is assigned a significance score for one or more languages covered by the dictionary 105. The significance score is a weight based on: the presence of language specific characters; the length of the word fragment; and the importance of the word fragment for the discourse (for example, function words and inflections get higher weighting).

For example, Hungarian includes the words ad, is, mit, és, fényképezögépröl, Paganiniröl. The significance scores can express that fényképezögépröl is much more a Hungarian word than are ad, is, mit which also appear in other languages. Similarly, a language specific letter (like Hungarian ö) gives a high significance score of the specific language.

Statistical methods can also be used to assign weights for pre-selected word fragments. To do so, a text corpus that contains texts in detected languages can be analyzed for numbers of occurrences of the fragments in every language, which can be interpreted as likelihood of the fragment in respective languages.

The significance scores can be used to provide negative weights for word-fragments as well as positive weights. Roughly speaking, the significance weights can be used to describe what is English, Russian, etc. as well as what is non-English, non-Russian, etc.

The additional score can be used to apply additional language constraints which may be satisfied by the word fragment. For example, a requirement that the next/previous syllable to the word fragment must start with a particular letter or has a particular type of vowel.

To explain the application of the additional score, the following example is useful. Plural forms of nouns in Turkish are formed of the suffixes -ler and -lar. To satisfy vowel harmony, suffix -ler must be used if the vowel of the last syllable is one of i, e, ö, ü. Turkish endstring -ler can be used for language identification. In this case Turkish word tespitler will be correctly identified as Turkish even though it has no special Turkish letter. But English words such as crawler, controller, smaller, fuller, and proper names, Bowler, Szaller are also likely to be identified as Turkish words, which is unwanted. However, the ending -ler could be used with the additional constraint that the closest vowel on the left should belong to the list {i, e, ö, ü}. If this additional constraint is satisfied, the word gets an additional positive score for Turkish. If the additional constraint is not satisfied the word gets a small negative score for Turkish.

Finite-State Automata (FSA)

Word fragments (including whole words, word-initial, word-internal, and world-final fragments) that are typical for languages under consideration are compiled into a single finite-state device, which provides a compact representation of the feature-set and fast search of world fragments. The finite-state device can be efficiently implemented as acyclic finite-state automata (FSA), also known as Directed Acyclic Word Graphs.

Storing word fragments for all languages in one dictionary implemented as a single finite-state device, means that the processing requirements and time do not depend on the number of languages known to the system.

The input list of keywords is compiled into a letter tree, which is then minimized to reuse common postfixes. Glosses can be attached to the leaves (the terminals) of the letter tree. Two postfixes can be merged only if they lead to exactly the same information (glosses). Finite-state automata constructed this way are acyclic and deterministic. This means that for each state there can be only one or zero outgoing links labelled by any given character, and there is no route that returns to any state.

Figure 2:
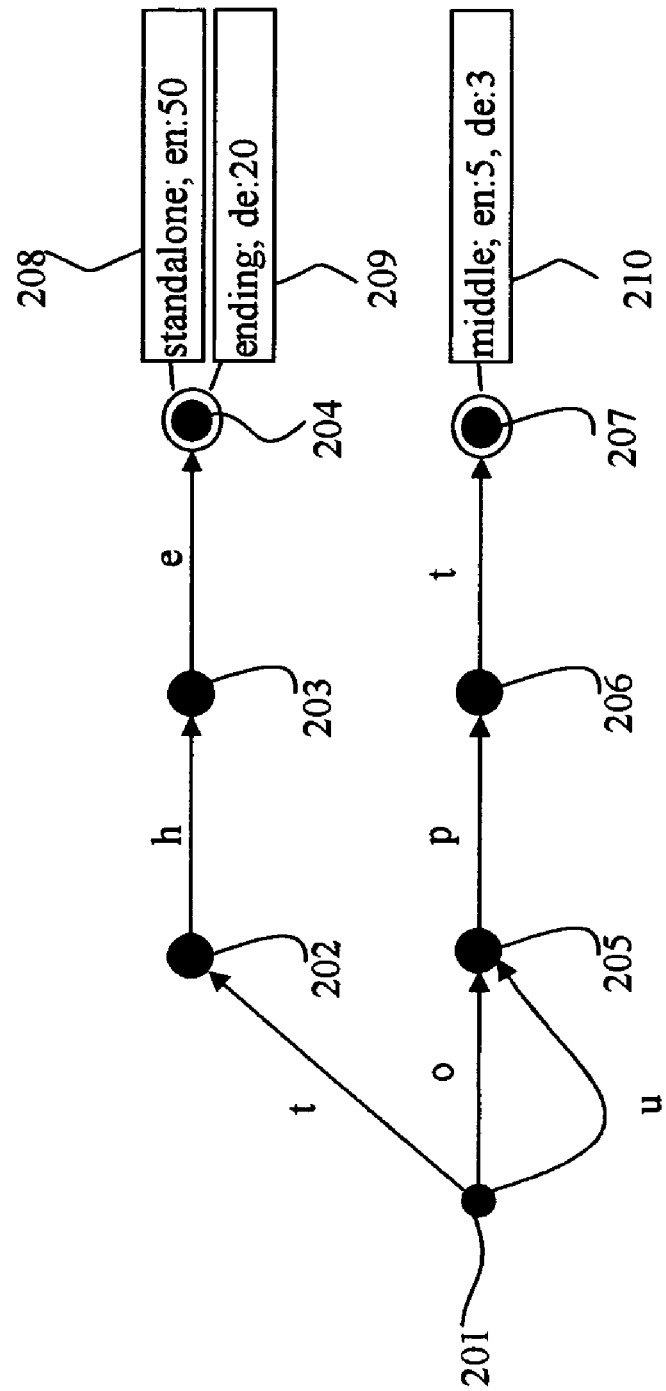
FIG. 2 is a schematic diagram of a letter tree structure for compiling word fragments in accordance with an aspect of the present invention.

FIG. 2 shows a sample letter tree (direct acyclic graph) containing the word fragments the,opt,upt. The sequence of letters 'the' in text will result in a sequence of states 201, 202, 203, 204, where state 204 is final and has an associated piece of information (gloss).

If the sequence constitutes a separate token, gloss 208 is used, which gives a score of 50 for English language.

In the case where the sequence is matched at the end of the token, i.e. the end of the sequence matches the end of the token, while the beginning of the sequence is not in the beginning of the token, gloss 209 is used, which gives a score of 20 to German language.

Two of the fragments: opt and upt are using common postfix by sharing states 205, 206, 207, which is only possible if they are assigned common gloss 210. The detection of sequences can be performed by simply applying the automaton at every position of the analyzed token.

In the implementation, polymorphic node structure is used, which provides efficient processing for ideographic languages as well as for alphabetical ones. This means that format of nodes in memory and algorithms used to process them differ depending on the number of outgoing transitions in the node, as described in patents US20030135361A1 (GB0228942A).

Creation of the language models involves two interconnected components: choosing of parameters of the tokenizer; and creation of dictionary of word-fragments.

Tokenization of Text

Text is modeled by presenting word fragments from the dictionary. To enable the use of positional constraints associated with each word fragment, text must be chunked into tokens by a cross-linguistic tokenizer.

In an example implementation, ICU (International Components for Unicode) is used. ICU includes the Rule Based Break Iterator, which finds text boundaries using a finite-state machine compiled from regular expression-like rules. Boundaries, or break positions, are positions of spaces, control characters, punctuation characters, changes of script, breaks between each character of a particular script (useful for handling of Chinese), etc.

Figure 3:
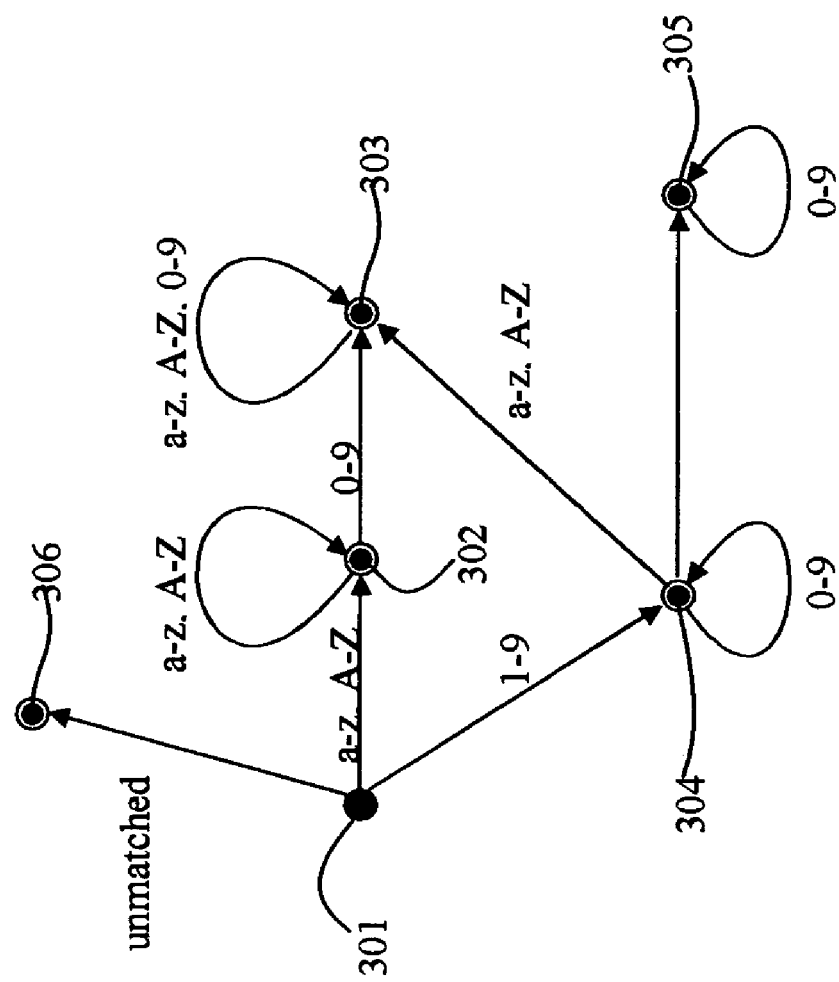
FIG. 3 is a schematic diagram of a finite-state automaton used for text chunking and detection of non-lexical items in accordance with an aspect of the present invention.

FIG. 3 represents the finite-state automaton used for text chunking and detection of non-lexical items. Analysis starts from the beginning state 301. Every character from the input text makes the automaton change its state according to allowed characters on transitions.

For example, word Hug will result in sequence of states 301, 302, 302, 302. The state 302 is a final or accepting state (encircled point), which means that the sequence of characters can be accepted as a token. Sequence of characters Hug, kiss will result in the same sequence of transitions, which will break at the comma.

The last accepting state defines the boundary of the first token (letter g) and the type of the token: state 302 is for alphabetic sequences, state 303 alphanumeric sequences, state 304 integer numbers, and state 305 floating point numbers. Unmatched characters, such as punctuation, are separated by state 306.

More complex automata are developed in real applications to detect uppercase, lowercase, and capitalized alphabetic items, which are potential lexical or morphological units of a language. The detected items also can be classified by the alphabet they are using, to additionally restrict the languages they belong to (for example, Cyrillic characters can not be used by English words).

In most cases, tokens thus found, are words. In some cases tokens are subwords or span across word boundaries. For example, Japanese texts are usually written using four different scripts: Kanji, Hiragana, Katakana and Roman. There are no spaces between Japanese words. Accurate word segmentation is typically performed by morphological analysis based on lexical and grammatical knowledge. Character based segmentation would split text not into lexical units, but into areas of the same script. However, the proposed technique relies on a dictionary of word-formation elements, which makes accurate segmentation of the input text into words not critical for the dictionary look-up; at the same time character based tokenization is faster than accurate segmentation into the lexical units.

Identification of Word-Fragments in Tokens

Usage of finite-state processing for the search in a space of character transitions makes token parsing in order to identify word-fragments computationally efficient. Different types of finite-state devices can be used, pursuing different strategies of parsing. For example, find all word fragments in a token, skip word-fragments that are part of bigger word fragments, allow overlapping word-fragments, find the segmentation of a token into the sequence of non-overlapping word-fragments (with gaps or without).

An example implementation uses the finite-state automaton representation of the word fragments lexicon, where positional constraints are encoded as the information attached to the final nodes instead of being encoded into the topology of the state-transition network. The method is also restricted to the longest left-to-right match from the beginning of tokens and the longest right-to-left match from the end of tokens. This is mainly for development speed, computational efficiency at run-time, and because in most commercially important languages the morphological head is either the rightmost or the leftmost morpheme of a word. The overlapping of word-initial and word-final fragments was allowed, but other word fragments were not allowed to be detected if the whole word was found in the dictionary.

Dictionary Compilation

In an example embodiment of dictionary compilation, word fragments may be selected for the dictionary following the procedure described below guided by linguistic insight:

Initial and final character unigrams for languages with distinctive scripts (such as Greek, Russian, Arabic, Korean). Chinese strings are broken on each character, so the comprehensive lists of ideograms from Chinese Simplified and Chinese Traditional are used.

Function words are used for Latin based languages.

"Brute force" approach—adding words from open categories (like nouns, verbs)—is used to improve the quality of the classification.

Word-initial and word-final fragments are used to improve the quality of the classification.

Significance scores can be chosen by an ad hoc presumption, without using statistics. For example, the score 1 can be assigned to each word from the dictionary, except for function words which get the score 3. Initial and final unigrams and bigrams are assigned 0.5. Word-final fragments, thought to be unique (or highly specific) for highly inflected languages, are assigned the score 1.5.

Selected word fragments for each language are tested against the available lists of words for other languages. If the word fragment is unique, its significance score was increased by an ad hoc factor 1.5.

Dictionary Look-Up Procedure

To allow for fast search of word-final fragments, keyword strings are reversed before compilation. Each keyword string "Word_fragment", which has constraint "word-final", is inverted. For example, the string "the" becomes the string "eht". To look-up a token for word-final fragments, the order of the characters in the token must correspondingly be reversed.

Figure 4:
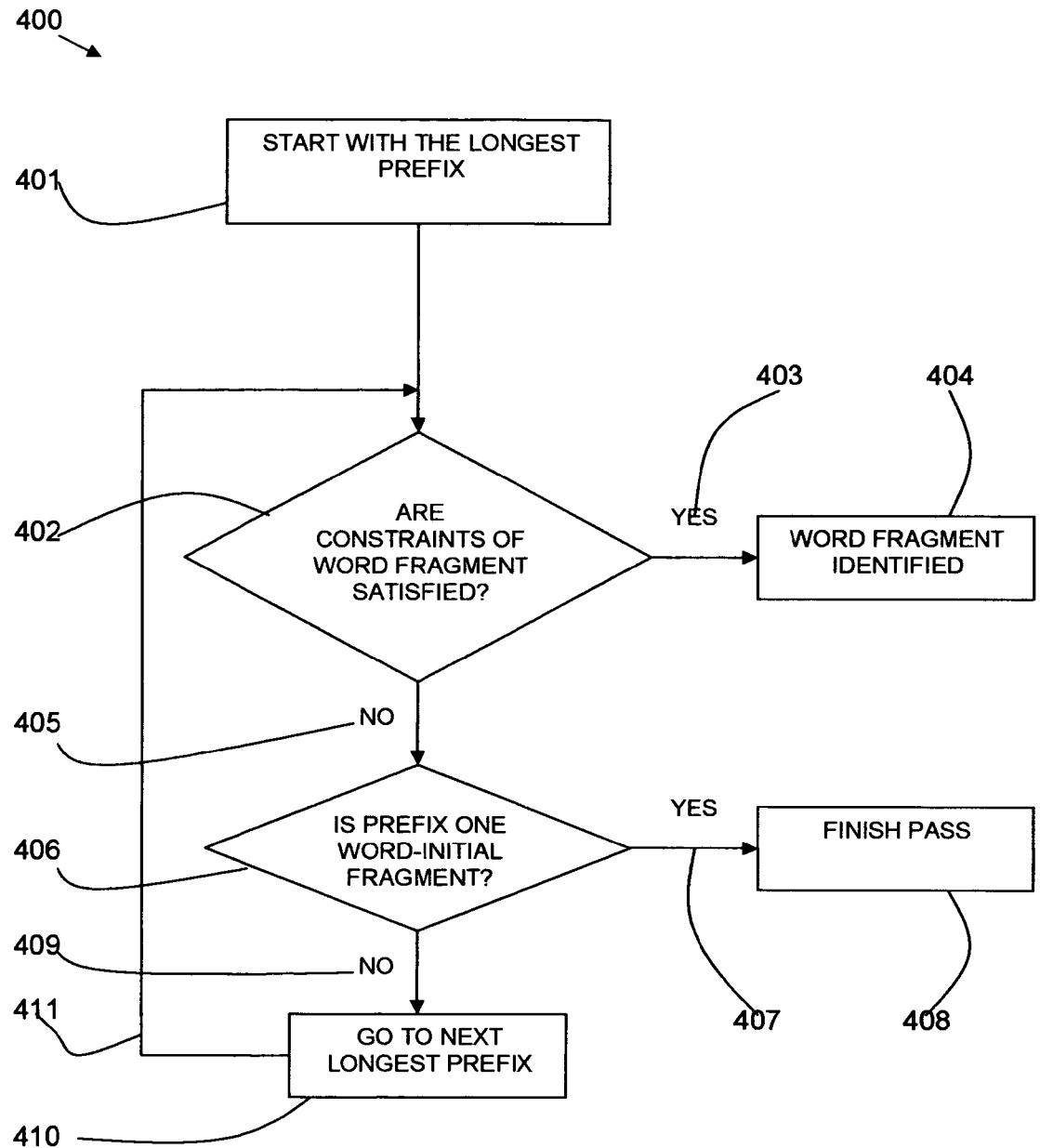
FIG. 4 is a flow diagram of a first pass of a dictionary look-up in accordance with an aspect of the present invention.

FIG. 4 is a flow diagram representation of a first pass 400 of a token look-up in a dictionary. One dictionary look-up in the lexicon of word-fragments compiled into the finite-state automaton provides the hierarchy of all possible prefixes. Each of the prefixes has associated information, including its "Position_within_word".

The word fragment is found if the positional constraints correspond to the "real" position of a word fragment within the token. All word-final fragments are ignored during the first pass.

Analyses of the positional information starts from the longest prefix 401. It is determined 402 if the "real" position satisfies the constraints of the word-fragment. If so 403, the word fragment is considered to be identified 404. The first pass is finished and the second pass is ignored.

If it is determined 402 that the constraints are not satisfied 405, it is determined 406 if the prefix is a word-initial fragment. If so 407, the pass is finished 408 and the processing goes to the subsequent pass. If not 409, the flow loops 411 and the next-longest prefix 410 is analyzed.

The following are examples of first pass word fragments.

If the fragment "the" is put into the dictionary as a stand alone word, it will not be found (and therefore taken into account in voting for languages) in surface forms like:

therm, thermodynamic, French thermomètre rather, anesthesia, syntheses absinthe, sunbathe;

sweetheart

Another example is a word fragment for the Italian pronoun chi (who)

"Word_fragment"="chi"

"Position_within_word"=whole word only;

This word fragment will not be found in the English word "child".

Figure 5:
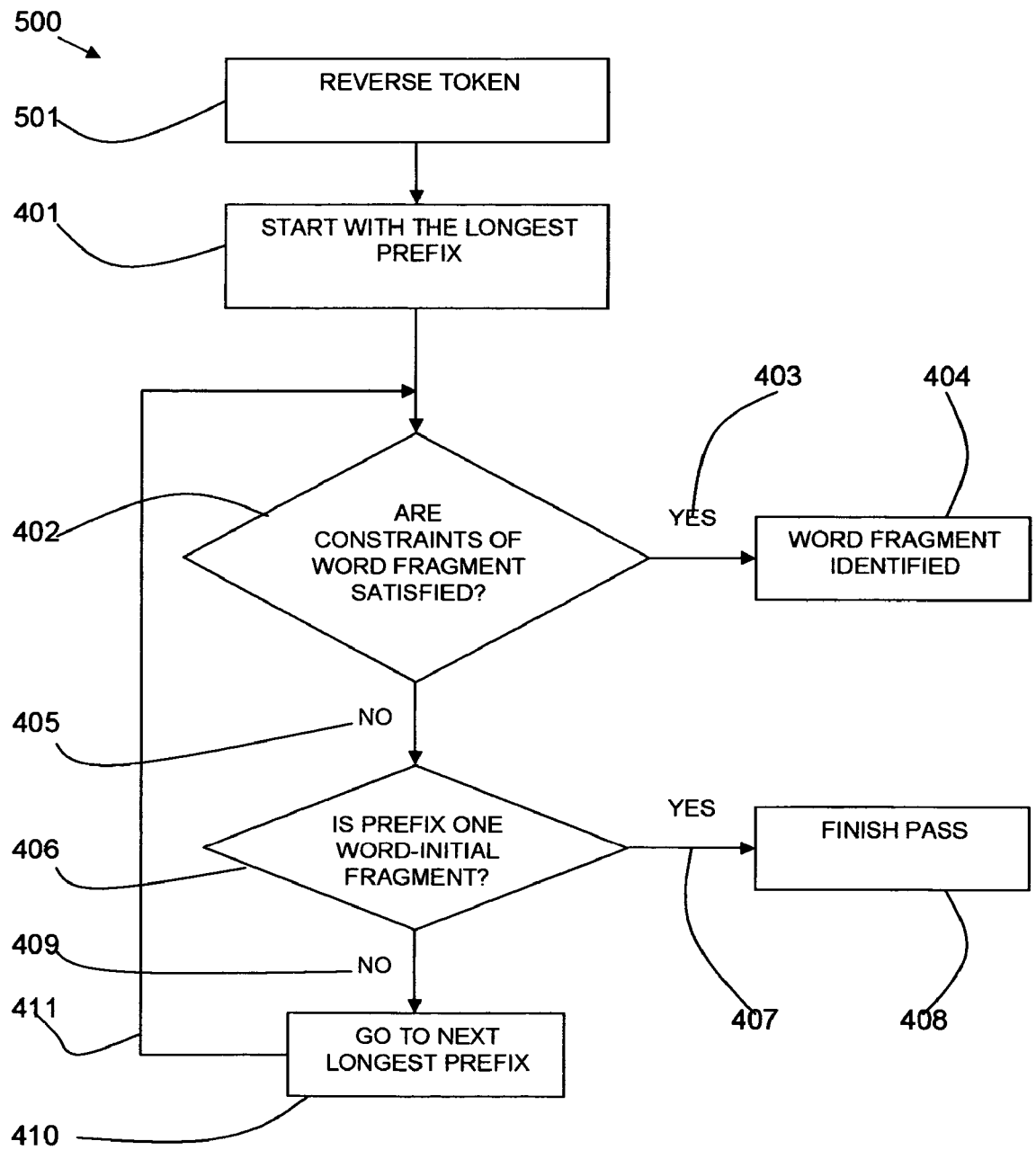
FIG. 5 is a flow diagram of a second pass of a dictionary look-up in accordance with an aspect of the present invention.

FIG. 5 shows a flow diagram representation of a second pass 500 of a token look-up in a dictionary for word-final word-fragments. At step 501, the token is reversed (word "tables" becomes "selbat") and the same procedure as in the first pass is done. The difference is that only word fragments which have the constraint "word-final" are accepted. Examples of language indicative endstrings are -tion (typical of English and French) and -ción (typical of Spanish).

The model of the input text is compared to the reference language models. For each word fragment identified, its significance score "WeightLang_i" is added to the score of the language number i. Languages are sorted according to the score and the top candidate is chosen.

Examples of Linguistic Rules Used for Significance Scores

Linguistic rules claim that there are no native Hungarian worlds starting from two consonants, except in a few exceptions. The Hungarian language does have words with non-native pair consonants at the beginning due to borrowing of words from other languages. Nevertheless, the use of this rule is useful as a weak indicator of non-Hungarian language.

This is implemented by adding bigrams in word-initial position to the dictionary with small negative weights for Hungarian language. Thus the word szinte gets a small positive significance score weight to be a Hungarian word because of its native Hungarian word-initial segment sz-. At the same time Graphisoft, Opel Frontera, Freemail, spam, sponsorship will get small negative weight for their non-Hungarian origination demonstrated by the initial bigrams gr-, ft-, sp-. Frankensteinnek would get a small negative weight for non-typical Hungarian initial string fr-, but a positive weight for the more typical Hungarian endstring -nek.

Another example is the distinction between Russian and Bulgarian languages. In Bulgarian the hard sign is used in all forms of the same world. This suggests a decisive non-Russian feature: Consonant+HardSign+Consonant. This non-Russian feature is implemented by adding all combinations of three Cyrillic letter word-fragments following the pattern (C+HS+C) into the dictionary with negative weights for Russian.

Further examples of the usefulness of additional information are provided in the form of morphotactics. Morphotactics can define language constraints, for example, such as next/previous syllable must start with a particular letter or has a particular type of vowel.

Consider the following words from Hungarian texts:

Index, Indexnek, Schwarzenegger, Schwarzeneggernek.

The name Schwarzenegger and the technical term index could be perceived as International words which a priori must not add weight to any particular language. Endstring -nek is a popular Hungarian suffix. However, the endstring -nek by itself could serve only as a very weak indicator of Hungarian language (for example, due to Czech worlds podminek, or Polish word rodzynek). In most conventional classification systems, Schwarzeneggernek is more likely to be classified as German, not Hungarian. But it is clear that the inflection of the International word Schwarzenegger in a Hungarian manner is a signature of the Hungarian language. In this way, a weak Hungarian feature -nek becomes decisive in the presence of an international word.

The above example can be implemented as follows:
1. A new language—Latin-based-International—is added to the system.
2. Words like Schwarzenegger, index, are added to the dictionary with the following positional constraints: word and word-initial fragments.
3. These words are assigned weights: 1.0 for Latin-based-International language, 0.0 for other languages.
4. The dictionary entries for inflectional and derivational endstrings, like Hungarian -nek, are modified. A new gloss is added under the name "additional_score", this gloss holds information about the additional significance score if the word has word-initial fragment from Latin-based-International language.
5. During run-time (identification of word-fragments in token, after finishing text modeling stage) the additional check is done:

if the word-final fragment was found, and if it is provided with the gloss "additional_score" and if the word-initial fragment was found and it belongs to Latin-based-International language, the additional significance score is added.

This has the advantage that language identification becomes more robust to the inclusion of international words. In some cases, the presence of international word-formation in an analyzed text simplifies language identification instead of hampering it.

The example given previously of the treatment of the Turkish suffix -ler can be handled as follows:
1. During features identification, Turkish endstring -ler will be first found in the input world (for example, Turkish tespitler or English smaller).
2. If additional constraints are satisfied, the word gets a positive score for Turkish.
3. If additional constraints are not satisfied, the word gets a small negative score for Turkish.

In the described method and system, linguistic expertise is used for both feature selection for languages and for assigning significance scores. Both of these steps can be automated and the following method is an example implementation of automated feature selection for a dictionary.Language models or training lists of words are used to select varying length character sequences that are a characteristic feature of subsets of words that should be recognized. Analyzed words are classified by detecting the above mentioned sequences in them.

1. A training list of words belonging to several predefined word classes (e.g. languages) is taken. Words are represented using the same or different character encodings, in the latter case the system can be used for detecting the encoding of the text by defining separate classes for different encodings of the same language. Every word is assigned weights (a vector of weights) for its being a member of target word classes. All sub-sequences are generated that appear within the words. If the number of sub-sequences is too big to process, only sub-sequences of limited length are generated. The sub-sequences that appear at the beginnings or at the ends of words or those which in themselves are full words are distinguished from each other and from those which appear in the middle of words. Weights are calculated for the sub-sequences by summing the weights of all words that contain these sub-sequences. This produces a collection of sub-sequences with associated weight.

2. The collection of sub-sequences is filtered to reduce its size. A weight criterion is chosen. For example, only sub-sequences, which have representation in only one word class, are considered. For every matched sub-sequence all its own sub-sequences (which must be also in the collection by definition) are also analyzed for matching the criterion. Only sub-sequences matching the criterion, which do not have a sub-sequence that also matches the criterion are left in the collection.

3. The filtered collection is used to classify words whether they were present or not in the original training list. The analyzed words are processed by detecting of presence of the sub-sequences from the filtered collection within them. The sub-sequence property of being matched at the beginning or at the end of the word or being a whole word must be matched. The classification of analyzed word is performed by either: a) taking first successful sub-sequence match and assigning the class with biggest weight in it; or b) calculating a resulting class weights as sums of weights for all sub-sequences met in the word and selecting the biggest weight. Words that do not contain sub-sequences remain unclassified.

Figure 6:
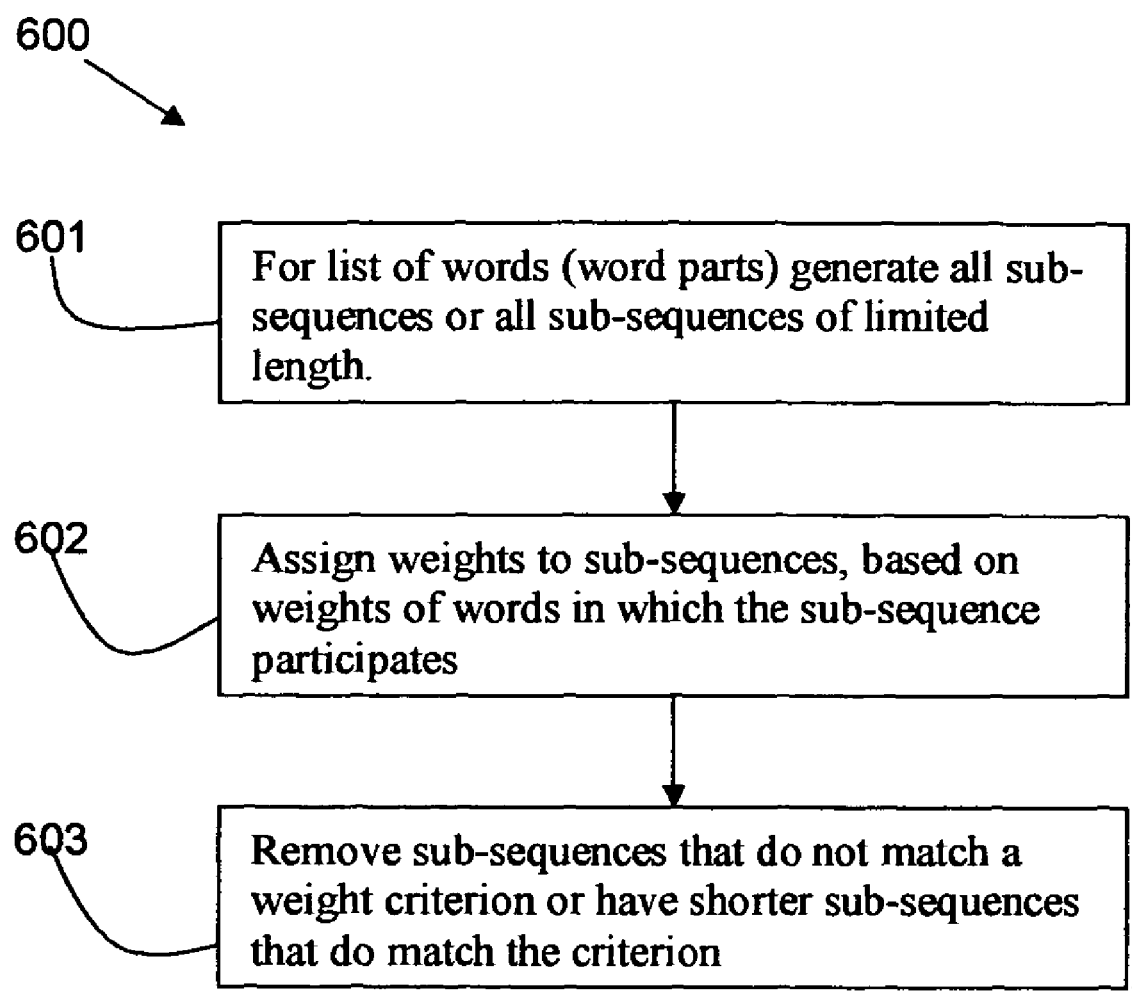
FIG. 6 is a flow diagram of a method in accordance with an aspect of the present invention.

FIG. 6 shows a flow diagram 600 of the automated process of assigning weights to word fragments. At first step 601, for a list of word fragments, all sub-sequences or sub-sequences of limited length are generated. At second step 602, weights are assigned to sub-sequences based on the weights of words in which the sub-sequence participates. At third step 603, sub-sequences that do not match a weight criterion or have shorter sub-sequences that do match the criterion are removed

EXAMPLE

An example is given of telling between Norwegian Bokmal and Danish languages, which are closely related. Two lowercase dictionaries are used to create a combined wordlist, where every word is marked by the language(s) to which it belongs.

Next all character sub-sequences shorter than N=9 characters (purely for convenience to limit the number of sub-sequences) are generated. Two weights are assigned to every sub-sequence, which are the numbers of words in each language that contain the sub-sequence. Then all sub-sequences are removed except for those, which a) appear in only one language, and b) do not have shorter sub-sequences within them with same properties. Table 1 shows the first 10 rows of the result:

TABLE 1

| Sub-sequence | Language | # of words covered |
| --- | --- | --- |
| Sjon | Bokmal | 10558 |
| ighet | Bokmal | 8431 |
| Rbei | Bokmal | 5442 |
| Beid | Bokmal | 5400 |
| Asjo | Bokmal | 5196 |
| ghete | Bokmal | 4030 |
| Øj | Danish | 3827 |
| Ningern | Danish | 3280 |
| Legg | Bokmal | 3264 |
| Thet | Bokmal | 2824 |

The presence of sub-sequences is detected by using a finite-state transducer, which produces classification output (language codes) for every matched sub-sequence. A decision is made using first matched sub-sequence. Applying the algorithm for every word in a document, words are counted that are classified as Bokmal or Danish, and a language guess is produced based on word classification.

This method can also be applied to codepage detection and document classification. The list can contain sequences that use different codepages at the same time. Thus, the problem is not different from the problem of language detection considered above. The only part that requires specification is the word boundary detection in the classified document. Two solutions can be used:

In case of most frequently used encodings, the word boundary detection can be done by finding white spaces and punctuation marks, which are shared by many encodings.

The whole document can be considered a single sequence, and classification can be done by just finding sub-sequences there.

The described method and system have the following advantages over conventional language identification systems.

Many language models can be developed in a short period of time. This demonstrates the flexibility of the language model and the ease of using linguistic insight based on natural text observations and understanding of morphological properties and properties of writing systems for the selection and weighting of word fragments.

The data repository is small—for 16 languages, approximately 40,000 word fragments can be compiled into 241 KB the 19 languages it is 1 MGB. It is also highly scalable with the ease of improving the quality of categorization by adding more word-fragments.

The often quoted difficulty of accurate word segmentation is compensated by: a) moving from chunking input text into orthographic words to tokens whose selection is based on the Unicode properties of characters, and b) by using a lexicon which is more a lexicon of word-formation elements, than a full-form lexicon.

A computationally efficient implementation of this method is based on finite-state processing. The described method and system utilizes one dictionary, instead of the obvious implementation of a separate lexicon for each language.

The described method and system introduces word fragments of variable length, allowing the use of word fragments as distinctive as function words. Positional constraints, associated with each word fragment in the described method, are computationally more efficient than the traditionally used surrogate methods. Feature space of word fragments could be potentially used for other categorization tasks (for example, for topic detection), where frequency profiles of terms, N-grams, stems or suffixes (like "biomedical"-ergic which is the concatenation of basic suffixes -erg- and -ic) are helpful. The use of cross-linguistic tokenizer described makes preliminary language identification redundant.

The described method and system introduce a finite-state automaton which allows for compact storage of word fragments of variable length with specified position within tokens and, extremely fast run-time finding of words, word-initial and word-final fragments within a token. The same automaton could be used for detection of word-internal fragments.

The described method and system provide a framework for achieving not only high recall but high precision as well in language identification. Previous method in language identification describe what is a language, and if it is not this language, then it means it is one of the other languages known to the system. For long texts this is an impediment as a text can be identified as unknown language if it shows less than usual evidences for a particular language for the texts of this size. However, for short texts this doesn't work well.

The Figures includes flowchart and block diagram illustration of methods, apparatus(s) and computer program products according to an embodiment of the invention. It will be understood that each block in the flowchart and block diagram illustrations, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A system for language identification, comprising:
   at least one processor;
   at least one computer readable storage medium;
   a feature set of a plurality of character strings of varying length with associated information;
   the associated information including one or more significance scores for one of the character strings for one or more of a plurality of languages, wherein the significance scores include a basic significance score and an additional significance score, wherein the additional significance score is for application in response to detection of a characteristic in a syllable other than the character string within a word containing the character string, and wherein the characteristic comprises the syllable containing a letter matching a letter contained in a predetermined set of one or more letters; and
   program code executable on the at least one processor and stored on the at least one computer readable storage medium, for detecting the character string from the feature set within a token from an input text and for detecting the characteristic in a syllable other than the character string within a word containing the character string within the input text responsive to detecting the character string within the input text.

2. The system of claim 1, wherein the system includes a finite-state device and the associated information is provided as glosses at the final nodes of the finite-state device for each character string.

3. The system of claim 2, wherein the character strings are compiled as a letter tree minimized to reuse common postfixes with common glosses.

4. The system of claim 1, wherein the significance scores for the plurality of languages include positive and negative scores.

5. The system of claim 1, wherein the associated information includes significance scores based on linguistic rules.

6. The system of claim 1, wherein the associated information includes positional information of the character string within a token.

7. The system of claim 6, wherein the positional information includes complete word, word-initial, word-final, and word-internal indications.

8. The system of claim 1, wherein the feature set is formed of character strings for a plurality of languages, using single or multiple character encodings.

9. The system of claim 1, wherein the system includes means for dividing an input text into lexical or morphological tokens.

10. The system of claim 1, wherein the significance scores for a character string are based on one or more of the group of: the presence of language specific characters; function words; the length of the character string; the importance of the character string in a training corpus.

11. The system of claim 1, further comprising means for determining the language of the input text from the significance scores.

12. The system of claim 1, further comprising:
    wherein the other syllable in the word containing the character string is adjacent to the character string previous to the character string.

13. The system of claim 1, further comprising:
    wherein the other syllable in the word containing the character string is adjacent to the character string after the character string.

14. The system of claim 1, further comprising:
    wherein the other syllable in the word containing the character string is a word-initial fragment, and the character string is an endstring.

15. The system of claim 1, wherein the characteristic further comprises the syllable immediately preceding the character string, the letter contained in the syllable comprising a closest vowel to the character string, and the predetermined set of one or more letters comprises a list of vowels.

16. The system of claim 1, wherein the characteristic further comprises the syllable immediately preceding the character string, and the letter contained in the syllable comprising an initial character of the syllable.

17. The system of claim 1, wherein the characteristic further comprises the syllable immediately following the character string, and the letter contained in the syllable comprising an initial character of the syllable.

18. A method for language identification embodied in at least one computer system, comprising:
    inputting, by the computer system, a text;
    dividing, by the computer system, the input text into tokens;
    detecting, by the computer system, character strings within the tokens from a feature set of a plurality of character strings of varying length with associated information, the associated information including one or more significance scores for a character string for one or more of a plurality of languages, wherein the significance scores include a basic significance score and an additional significance score for at least one of the character strings, wherein the additional significance score is for application in response to detection of a characteristic in a syllable other than the character string within a word containing the character string, and wherein the characteristic comprises the syllable containing a letter matching a letter contained in a predetermined set of one or more letters; and detecting, by the computer system the at least one characteristic in a syllable other than the character string within a word containing the character string within the input text responsive to detecting the character string within the input text.

19. The method of claim 18, further comprising identifying all character strings within the input text and adding the significance scores for a particular language for all character strings identified.

20. The method of claim 19, further comprising determining the language of the input text by sorting the significance scores for the plurality of languages and selecting the language with the highest score.

21. The method of claim 18, wherein the feature set is provided as a finite-state device and the associated information is provided as glosses at the final nodes of the finite-state device for each character string.

22. The method of claim 18, wherein the significance scores for the plurality of languages include positive and negative scores.

23. The method of claim 18, wherein the associated information includes significance scores based on linguistic rules.

24. The method of claim 18, wherein the associated information includes positional information of the character string within a token.

25. The method of claim 24, wherein the positional information includes complete word, word-initial, word-final, and word-internal indications.

26. The method of claim 18, wherein the feature set is formed of character strings for a plurality of languages, using single or multiple character encodings.

27. The method of claim 18, wherein the detecting character strings within a token comprises analyzing positional data and looking up a token for decreasing lengths of prefixes.

28. The method of claim 27, wherein word-final tokens and character strings are reversed.

29. The method of claim 18, further comprising:
wherein the other syllable in the word containing the character string is adjacent to the character string previous to the character string.

30. The method of claim 18, further comprising:
wherein the other syllable in the word containing the character string is adjacent to the character string after the character string.

31. The method of claim 18, further comprising:
wherein the other syllable in the word containing the character string is a word-initial fragment, and the character string is an endstring.

32. The method of claim 18, wherein the characteristic further comprises the syllable immediately preceding the character string, the letter contained in the syllable comprising a closest vowel to the character string, and the predetermined set of one or more letters comprises a list of vowels.

33. The method of claim 18, wherein the characteristic further comprises the syllable immediately preceding the character string, and the letter contained in the syllable comprising an initial character of the syllable.

34. The method of claim 18, wherein the characteristic further comprises the syllable immediately following the character string, and the letter contained in the syllable comprising an initial character of the syllable.

35. A computer program product stored on a computer readable storage medium, the computer readable storage medium having program code stored thereon for language identification, the program code comprising:

program code for inputting a text;

program code for dividing the input text into tokens;

program code for detecting character strings within the tokens from a feature set of a plurality of character strings of varying length with associated information, the associated information including one or more significance scores for a character string for one or more of a plurality of languages, wherein the significance scores include a basic significance score and an additional significance score for at least one of the character strings, wherein the additional significance score is for application in response to detection of a characteristic in a syllable other than the character string within a word containing the character string, and wherein the characteristic comprises the syllable containing a letter matching a letter contained in a predetermined set of one or more letters; and program code for detecting the at least one characteristic in a syllable other than the character string within a word containing the character string within the input text responsive to detecting the character string within the input text.

* * * * *